(12) United States Patent
DeStefano (10) Patent No.: US 11,850,490 B1
(45) Date of Patent: Dec. 26, 2023

(54) METHOD AND SYSTEM FOR ARTIFICIAL INTELLIGENCE CLUB FITTING

(71) Applicant: Callaway Golf Company, Carlsbad, CA (US)

(72) Inventor: Charlie DeStefano, Carlsbad, CA (US)

(73) Assignee: Topgolf Callaway Brands Corp., Carlsbad, CA (US)

( * ) Notice: Subject to any disclaimer, the term of this patent is extended or adjusted under 35 U.S.C. 154(b) by 45 days.

(21) Appl. No.: 17/723,819

(22) Filed: Apr. 19, 2022

Related U.S. Application Data (63) Continuation-in-part of application No. 17/569,322, filed on Jan. 5, 2022.

(60) Provisional application No. 63/179,886, filed on Apr. 26, 2021, provisional application No. 63/136,511, filed on Jan. 12, 2021.

(51) Int. Cl.
| | |
|---|---|
| *A63B 69/36* | (2006.01) |
| *A63B 24/00* | (2006.01) |
| *G06Q 30/0202* | (2023.01) |
| *G06N 20/00* | (2019.01) |
| *G06Q 30/0282* | (2023.01) |

(52) U.S. Cl.
CPC ...... *A63B 69/3605* (2020.08); *A63B 24/0006* (2013.01); *G06N 20/00* (2019.01); *G06Q 30/0202* (2013.01); *G06Q 30/0282* (2013.01); *A63B 2024/0009* (2013.01)

(58) Field of Classification Search
CPC .............................................. A63B 69/3605
See application file for complete search history.

(56) References Cited

U.S. PATENT DOCUMENTS

| | | | | | |
|---|---|---|---|---|---|
| 4,063,259 | A | * | 12/1977 | Lynch ............... | A63B 69/3605 396/335 |
| 5,245,537 | A | * | 9/1993 | Barber .................. | A63B 71/06 700/91 |
| 5,558,333 | A | * | 9/1996 | Kelson ............... | A63B 69/3605 473/131 |
| 6,083,123 | A | * | 7/2000 | Wood ................. | A63B 69/3605 473/409 |
| 6,506,124 | B1 | * | 1/2003 | Manwaring ........ | A63B 69/3605 473/409 |
| 8,113,967 | B1 | * | 2/2012 | Seluga .................. | A63B 60/42 473/409 |
| 9,192,836 | B1 | * | 11/2015 | Johannesen ............ | A63B 60/42 |
| 9,403,059 | B1 | * | 8/2016 | Johannesen ........ | G06Q 30/0621 |
| 2002/0152796 | A1 | * | 10/2002 | Katayama .......... | A63B 69/3605 73/11.01 |
| 2002/0156598 | A1 | * | 10/2002 | Boehm .............. | A63B 69/3605 702/182 |
| 2003/0115011 | A1 | * | 6/2003 | Boehm .............. | A63B 69/3605 702/127 |

(Continued)

FOREIGN PATENT DOCUMENTS

| | | | | | |
|---|---|---|---|---|---|
| CA | 2280171 | A1 | * | 8/1998 | |
| CA | 2755926 | A1 | * | 3/2009 | ......... A63B 24/0003 |

(Continued)

*Primary Examiner* — Alvin A Hunter
(74) *Attorney, Agent, or Firm* — Michael A. Catania (57) ABSTRACT

An artificial intelligence (A.I.) club fitting tool is disclosed herein. The AI engine includes mass properties and launch conditions in models. New product recommendations are immediately available to fitted golfers.

8 Claims, 6 Drawing Sheets

(56) References Cited

U.S. PATENT DOCUMENTS

| | | | |
|---|---|---|---|
| 2003/0176988 A1* | 9/2003 | Boehm | A63B 37/0096 |
| | | | 702/182 |
| 2004/0111333 A1* | 6/2004 | Kang | G06Q 10/087 |
| | | | 705/26.61 |
| 2005/0277483 A1* | 12/2005 | Peterson | A63B 60/42 |
| | | | 473/282 |
| 2006/0287118 A1* | 12/2006 | Wright | A63B 69/3632 |
| | | | 473/131 |
| 2007/0167249 A1* | 7/2007 | Voges | A63B 24/0021 |
| | | | 473/222 |
| 2009/0017945 A1* | 1/2009 | Tayama | A63B 69/3658 |
| | | | 473/409 |
| 2009/0088275 A1* | 4/2009 | Solheim | A63B 69/3605 |
| | | | 473/409 |
| 2009/0131189 A1* | 5/2009 | Swartz | A63B 60/42 |
| | | | 473/409 |
| 2009/0131193 A1* | 5/2009 | Swartz | A63B 24/0006 |
| | | | 473/409 |
| 2009/0325721 A1* | 12/2009 | Esayian | A63B 69/36 |
| | | | 473/131 |
| 2010/0151956 A1* | 6/2010 | Swartz | A63B 60/42 |
| | | | 473/409 |
| 2011/0028248 A1* | 2/2011 | Ueda | A63B 69/3632 |
| | | | 473/409 |
| 2011/0207560 A1* | 8/2011 | Wright | A63B 24/0003 |
| | | | 473/407 |
| 2011/0237358 A1* | 9/2011 | Carpenter | A63B 57/00 |
| | | | 700/91 |
| 2013/0143685 A1* | 6/2013 | Margoles | A63B 60/42 |
| | | | 473/409 |
| 2014/0316542 A1* | 10/2014 | Beno | H04M 1/72403 |
| | | | 700/91 |
| 2015/0105183 A1* | 4/2015 | Kamino | A63B 60/42 |
| | | | 473/407 |
| 2017/0065866 A1* | 3/2017 | Okazaki | A63B 69/3605 |
| 2018/0169471 A1* | 6/2018 | Kondo | A63B 69/3605 |
| 2020/0155899 A1* | 5/2020 | Hixenbaugh | A63B 24/0021 |
| 2020/0406100 A1* | 12/2020 | Hixenbaugh | G06F 18/00 |
| 2022/0111275 A1* | 4/2022 | Bryson | A63B 60/46 |
| 2022/0219044 A1* | 7/2022 | Beach | A63B 60/46 |
| 2022/0296964 A1* | 9/2022 | Thurner | G16H 20/30 |
| 2023/0211216 A1* | 7/2023 | Johnson | A63B 24/0003 |
| | | | 473/278 |

FOREIGN PATENT DOCUMENTS

| | | | | |
|---|---|---|---|---|
| CN | 103372288 A | * | 10/2013 | ......... A63B 24/0006 |
| KR | 102242994 B1 | * | 4/2021 | |
| KR | 20210148453 A | * | 12/2021 | |
| KR | 20220071984 A | * | 6/2022 | |
| WO | WO-9611726 A1 | * | 4/1996 | ......... A63B 24/0003 |
| WO | WO-0071212 A1 | * | 11/2000 | ............ A63B 69/36 |
| WO | WO-0110518 A1 | * | 2/2001 | ......... A63B 71/0669 |
| WO | WO-02081039 A1 | * | 10/2002 | ......... A63B 24/0003 |
| WO | WO-2005118082 A1 | * | 12/2005 | ........... A63B 1/0622 |
| WO | WO-2009099932 A2 | * | 8/2009 | ......... A63B 69/3623 |
| WO | WO-2016185894 A1 | * | 11/2016 | ............ A63B 53/00 |

\* cited by examiner

METHOD AND SYSTEM FOR ARTIFICIAL INTELLIGENCE CLUB FITTING

CROSS REFERENCES TO RELATED APPLICATIONS

The Present Application claims priority to U.S. Provisional Patent Application Number 63/179886, filed on Apr. 26, 2021, and the present application is a continuation-in-part application of U.S. patent application No. 17/569,322, filed on Jan. 5, 2022, which claims priority to U.S. Provisional Patent Application Number 63/136,511, filed on Jan. 12, 2021, now expired, each of which is hereby incorporated by reference in its entirety.

STATEMENT REGARDING FEDERALLY SPONSORED RESEARCH OR DEVELOPMENT

Not Applicable

BACKGROUND OF THE INVENTION

FIELD OF THE INVENTION

The present invention generally relates to club fitting.

DESCRIPTION OF THE RELATED ART

Club fitting typically requires expert knowledge in swing mechanics, optimal ball flight characteristics, and available products and their designed performance qualities.

Depending on where you go for your fitting, you might get completely different sets of recommended clubs.

Personal bias can lead fitters to recommend sub-optimal clubs.

U.S. Pat. No. 6,702,692 for a Precise Fit Golf Club Fitting System And Golf Shaft Selection Method And Apparatus.

U.S. patent application Ser. No. 10/188,669 for an Automated Method And System For Golf Club Selection Based On Swing Type.

U.S. Pat. No. 6,719,648 for a Precise Fit Golf Club Fitting System And Golf Shaft Selection Method And Apparatus.

U.S. Pat. No. 6,083,123 for Method For Fitting Golf Clubs For Golfers.

U.S. patent application Ser. No. 10/602,075 for a Method For Matching Golfers With A Driver And Ball.

There is a need for a better fitting system.

BRIEF SUMMARY OF THE INVENTION

The present invention is an artificial intelligence (A.I.) club-fitting tool.

The present invention preferably mimics fitters, but it does not replace fitters.

The present invention preferably offers additional data points to assist fitters in fitting golf clubs to golfers.

The present invention preferably provides a training tool for new fitters to compare their recommendations against previous recommendations.

The present invention preferably promotes more consistent club recommendations across fitting venues.

The present invention preferably delivers design insights to designers of golf clubs.

The present invention preferably creates new marketing avenues for fitting of golf clubs.

The present invention preferably provides quality fitting anywhere.

One aspect of the present invention is a method for fitting a golf club to a golfer.

The method includes inputting a plurality of club properties into a device, the device in communication with a server comprising an artificial intelligence (AI) engine. The method also includes inputting shot data for a player's swing into the server. The method also includes sending the fitting ID and the shot ID as inputs to a python script stored on the server. The method also includes identifying active club type and good swings from the data on the SQL server. The method also includes loading a corresponding machine learning model for each club type selected from drivers, irons, fairways, and hybrids. The method also includes inputting club IDs and average swing specs to the model. The method also includes inputting club data comprising at least one of head, loft, shaft flex, shaft model, average head speed, average attack angle, or average path angle. The method also includes. The method also includes outputting fitting data comprising at least one of head, loft, shaft flex, shaft model, shaft weight, or a probability of optimal fit. The method also includes processing loops until the AI engine repeats a club recommendation.

Another aspect of present invention is a non-transitory computer readable medium storing instructions that optimize the fitting of a golf club to a golfer, when executed by a processor, cause the processor to input a plurality of club properties into a device, the device in communication with a server comprising an artificial intelligence (AI) engine. The processor also inputs shot data for a player into the server. The processor also sends the fitting ID and the shot ID as inputs to a python script stored on the server. The processor also identifies active club type and good swings from the data on the SQL server. The processor also loads a corresponding machine learning model for each club type selected from drivers, irons, fairways, and hybrids. The processor also inputs club IDs and average swing specs to the model. The processor also inputs club data comprising at least one of head, loft, shaft flex, shaft model, average head speed, average attack angle, or average path angle. The processor also outputs fitting data comprising at least one of head, loft, shaft flex, shaft model, shaft weight, or a probability of optimal fit. The processor also processes loops until the AI engine repeats a club recommendation.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

The AI engine preferably includes mass properties and launch conditions in models for golf club fitting, which preferably results in fewer outliers.

A larger training dataset (Eliminates "Active Product Only" restrictions) of golf club fittings is preferably provided to the AI engine.

Recommendations for new products are immediately available to fitted golfers. In the past, current/new models of golf clubs must wait until fitters had populated a database with recommendations for new product releases. The present invention resolves this problem.

Design Insight

The AI engine preferably provides down-range ball flight predictions for different club designs and swing-types.

Automated Fitting Analysis

The present invention preferably monitors A.I. performance to determine how A.I. is performing compared to human fitters.

The present invention preferably monitors fitter performance to determine how human fitters are performing compared to other human fitters.

The AI engine preferably provides quality-fitting recommendations at locations other than a main venue.

The present invention is capable of generating marketing emails for suggesting new products based on old fitting data.

The present invention provides for automated fitting kiosks operated at locations such as TOPGOLF® entertainment venues.

The present invention provides for improved no-swing fittings for websites based on data generated by the A.I. engine.

The present invention is capable of making golf club recommendations based off performance survey.

The present invention provides for is capable of finding the most similar players and recommendations in a fitting database.

The present invention provides valuable, unique, and actionable performance insights to professional tour players.

The present invention provides for is capable of identifying under/overvalued players currently on a professional tour, to find the next generation stars, predict upcoming performances, and/or understand tour player "DNA."

The present invention provides for player archetype and corresponding "Rules for Success" (Club Fittings and Course Strategies).

The present invention analyzes range performances vs round performances.

The present invention determines optimal player combine drills, i.e., which testable skills are most indicative of PGA Tour success.

AI-Generated Personal Practice Guides

The present invention identifies where to focus for biggest bang-for-your-buck based on recent performances, upcoming tournament difficulty, and available practice time.

The present invention provides ML models that predict how different strokes gained ("SG") combinations, i.e. Off-the-Tee, Approach, Around-the-Green, and Putting, will affect scores relative to the field, then we find "easiest" way to achieve the optimal SG combo based on how often they have reached similar levels throughout their career.

For each desired SG, recent performances for every recorded stat are compared with their historical baselines to find which should be easiest to achieve i.e. it may in fact be easier raise SG Putting by improving 5-10 foot putts by 20% than 10-15 foot putts by 5% if they have recently been putting below their average from 5-10 feet and above their average from 10-15 feet.

The present invention finds what will have largest impact for specific upcoming tournaments, not just the part of a golfer's swing that is the worst.

Tournament Difficulty Ratings

The present invention identifies how individual tournament stats compare vs PGA Tour averages, based on historical performances and strength of fields.

The present invention is used to identify favorable match-ups and adequately weight player performances tournament-to-tournament by normalizing Strokes Gained.

Personalized Off-the-Tee Strategies

The present invention optimizes trade-off between distance and accuracy to maximize projected SG Off-the-Tee for a given course layout.

TrueGolfSkill Player Ratings

The present invention provides a custom metric where players with higher ratings have higher probability of making birdie or better on a given hole.

The present invention provides better ratings that can result from either a player making birdies/eagles on more holes or on harder holes.

The present invention provides a variation of Microsoft's TrueSkill rating system used for online video games Tournament Leaderboard Projections. Machine learning models predict best, worst, and average expected finishing positions for each player in the field by using each player's average Strokes Gained from recent tournaments plus a random noise element, based on their standard deviations, and repeating for 1000 simulations.

Figure 1:
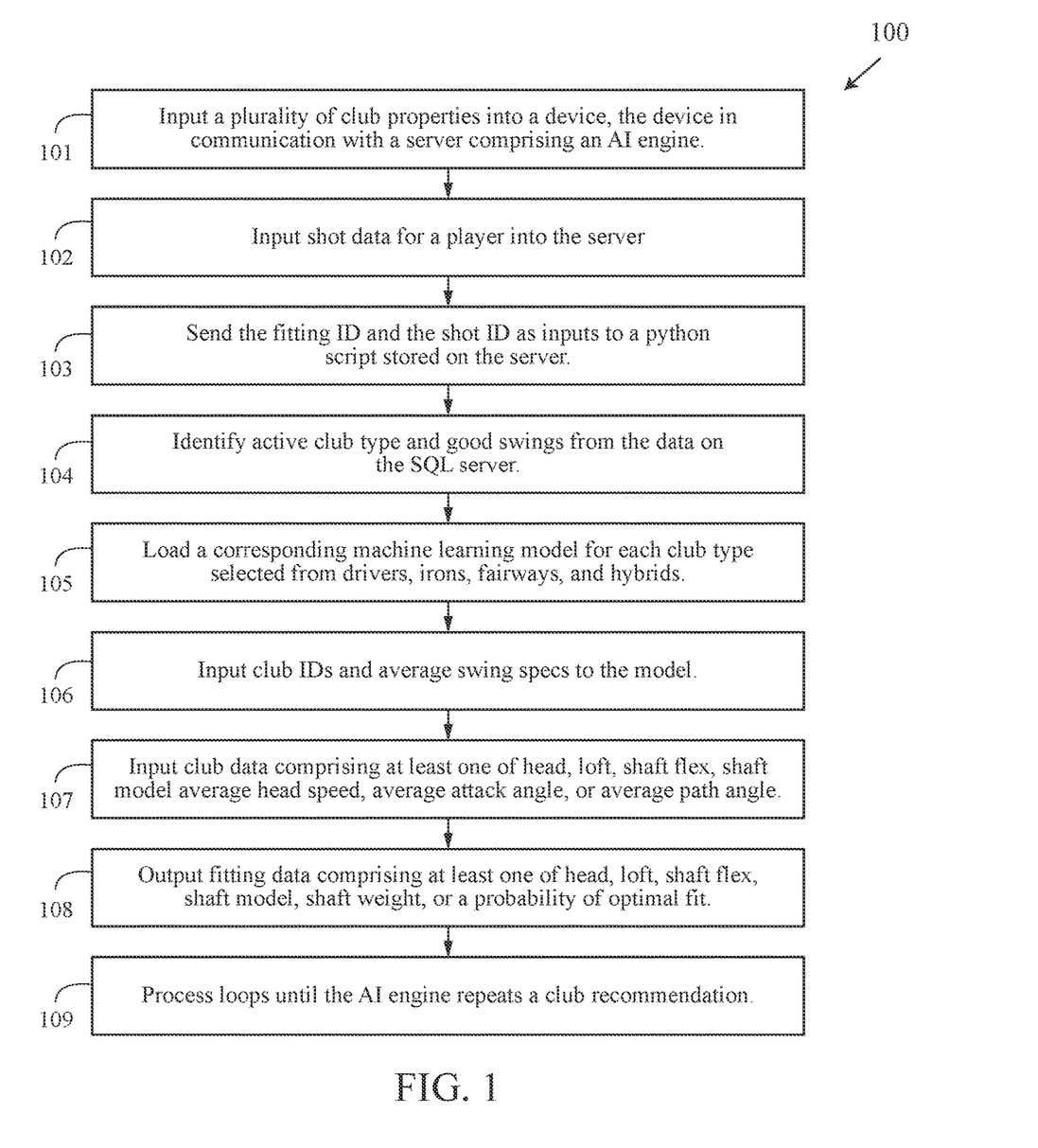
FIG. 1 is a flow chart of a method for fitting a golf club to a golfer.

FIG. 1 is a flow chart for a method 100 of the present invention. The method 100 includes inputting a plurality of club properties into a device, the device in communication with a server comprising an AI engine, at step 101. At step 102, inputting shot data for a player into the server. At step 103, sending the fitting ID and the shot ID as inputs to a python script stored on the server. At step 104, identifying active club type and good swings from the data on the SQL server. At step 105, loading a corresponding machine learning model for each club type selected from drivers, irons, fairways, and hybrids. At step 106, inputting club IDs and average swing specs to the model. At step 107, inputting club data comprising at least one of head, loft, shaft flex, shaft model, average head speed, average attack angle, or average path angle. At step 108, outputting fitting data comprising at least one of head, loft, shaft flex, shaft model, shaft weight, or a probability of optimal fit. At step 109, processing loops until the AI engine repeats a club recommendation.

Preferably, the machine learning models have been trained on past swing data and the resulting recommendations made by a plurality of fitters. The models are also preferably trained on active products only to avoid the possibility of recommending out-of-stock products.

In the present method, the components are compatible, i.e., head, shaft flex, and shaft model combo must be achievable. The top three club options are then presented, in order of total probability.

Figure 2:
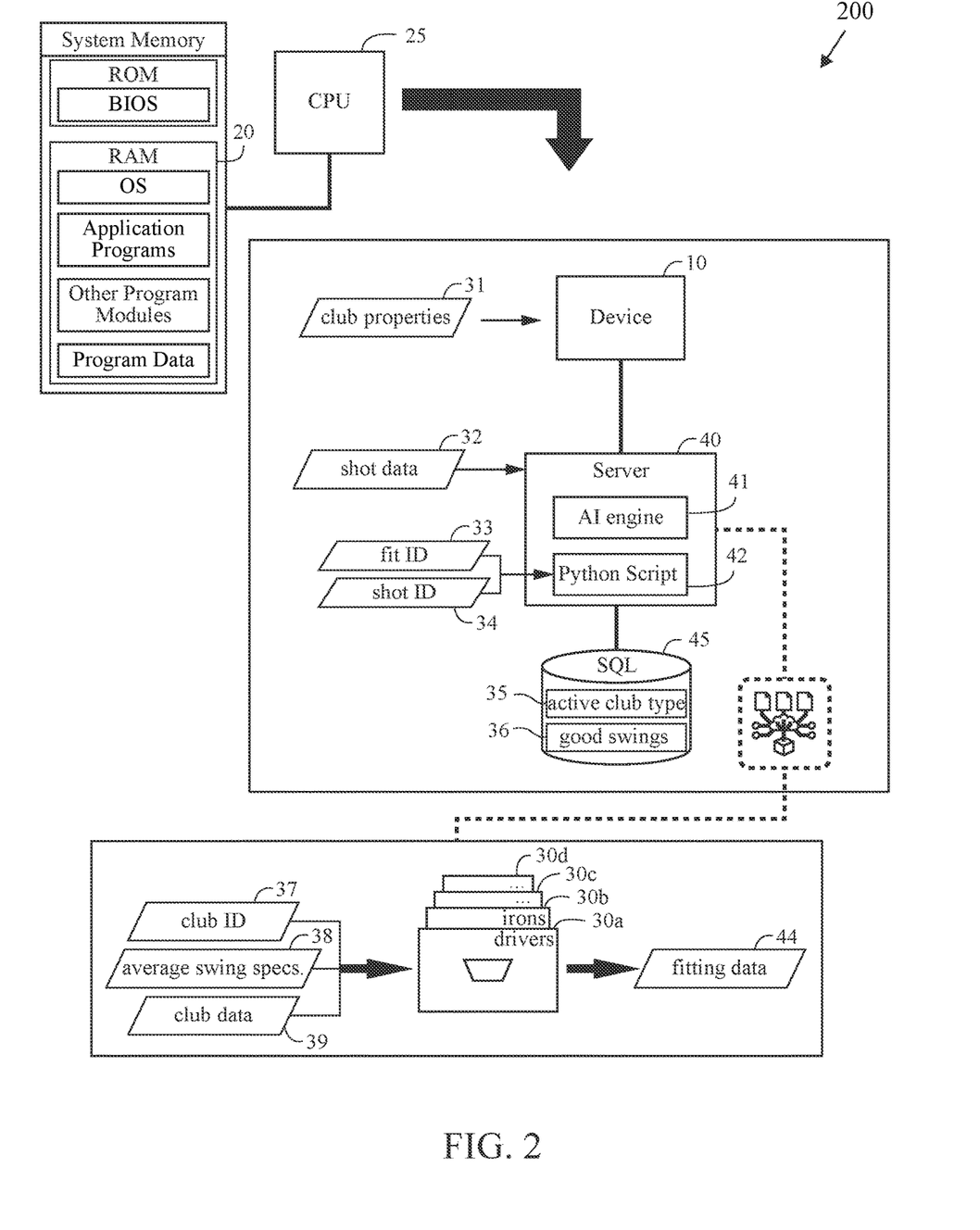
FIG. 2 is a block diagram of a system of the present invention.

FIG. 2 is a block diagram of a system 200 of the present invention. A non-transitory computer readable medium 20 stores instructions to optimize the fitting of a golf club to a golfer. When executed by a processor 25, the processor 25 inputs club properties 31 into a device 10. The device 10 is in communication with a server 40 with an AI engine 41. Shot data 32 for a player is input into the server 40. The fitting ID 33 and the shot ID 34 are sent as inputs into a python script 42 stored on the server 40. The active club type 35 and good swings 36 are identified from the data on the SQL server 45. A corresponding machine learning model 30a-30d is loaded for each club type selected from drivers, irons, fairways, and hybrids. Data input to the model 30 include club IDs 37, average swing specs 38, and club data 39. Club data 39 is of at least one of head, loft, shaft flex, shaft model, average head speed, average attack angle, or average path angle. Fitting data 44 is output, which includes at least one of head, loft, shaft flex, shaft model, shaft weight, or a probability of optimal fit. The loops are processed until the AI engine 41 repeats a club recommendation.

Figure 3:
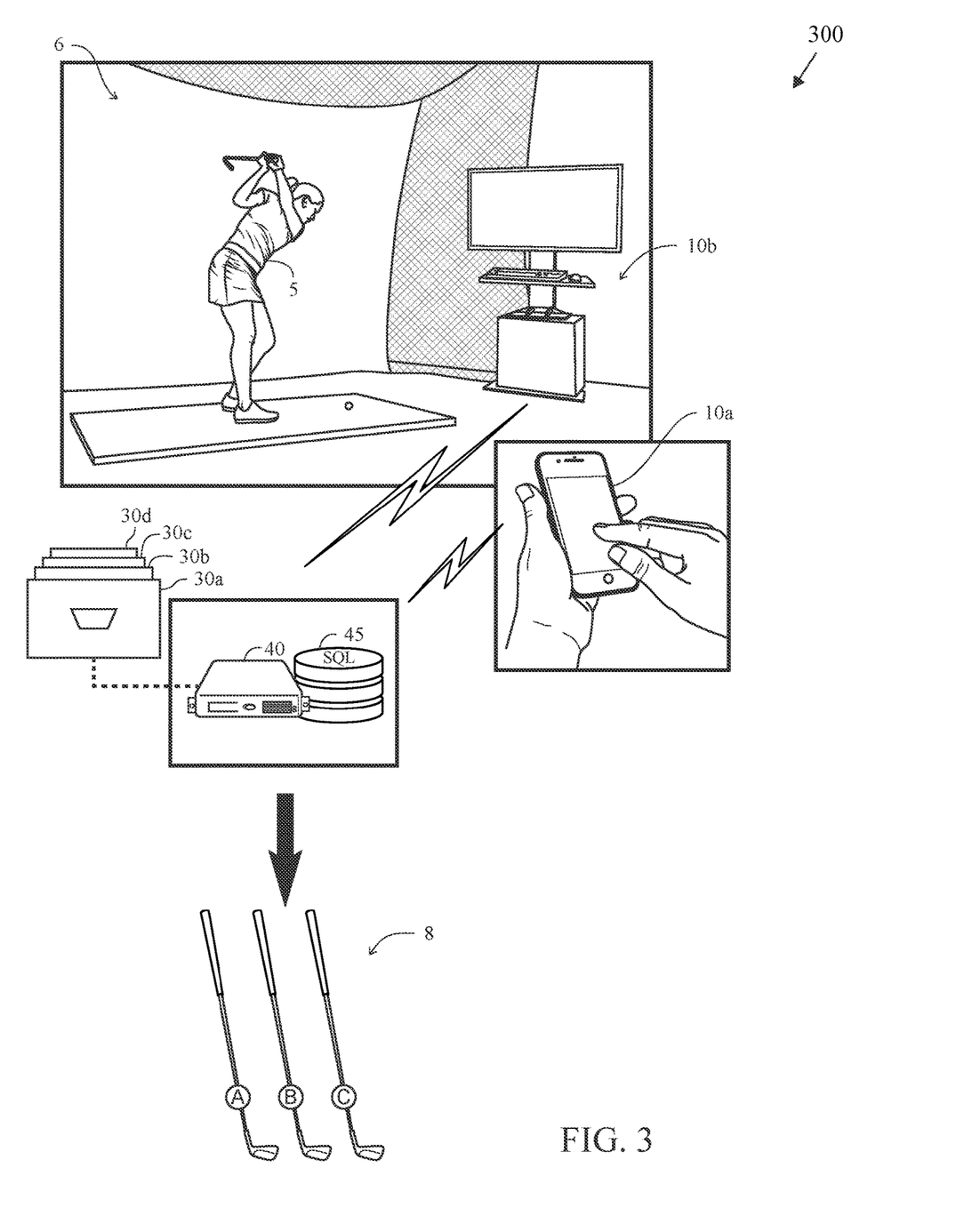
FIG. 3 is an illustration of components of a system of the present invention.

An illustration of components of a system 300 of the present invention is shown in FIG. 3. In the AI Club fitting process, club details 31 are entered into a device 10. A golfer 5 swings in a fitting bay 6 to have their swings analyzed manually. In another embodiment, the AI engine 41, residing in the server 40, will automatically detect "good" and "bad" shots. The shot data 32 is saved to a SQL server 45. Corresponding machine learning models 30a-30d are unique models for each type of club, i.e., drivers, irons, fairways, and hybrids. The top three club options 8 are presented in order of total probability.

Figure 4:
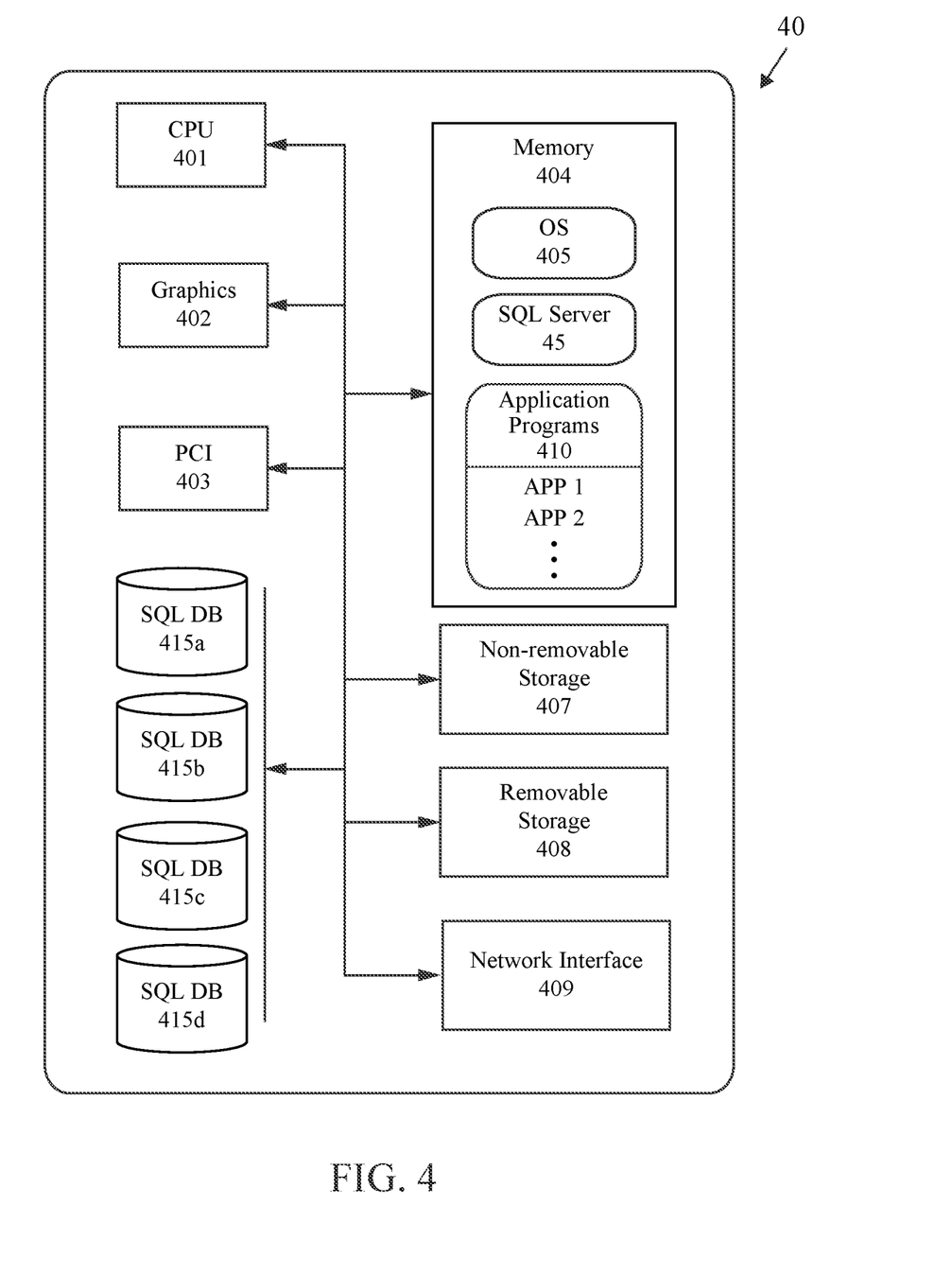
FIG. 4 is a block diagram of components of a server.

Components of a server 40 of the system, as shown in FIG. 4, preferably includes a CPU component 401, a graphics component 402, a PCI/PCI Express 403, memory 404, non-removable storage 407, removable storage 408, Network Interface 409, including one or more connections to a fixed network, and SQL database(s) 415a-451d. Included in the memory 404, is an operating system 405, a SQL server 45 or other database engine, and computer programs/software 410. Alternatively, the SQL server 45 can be installed in a separate server from the server 40.

Figure 5:
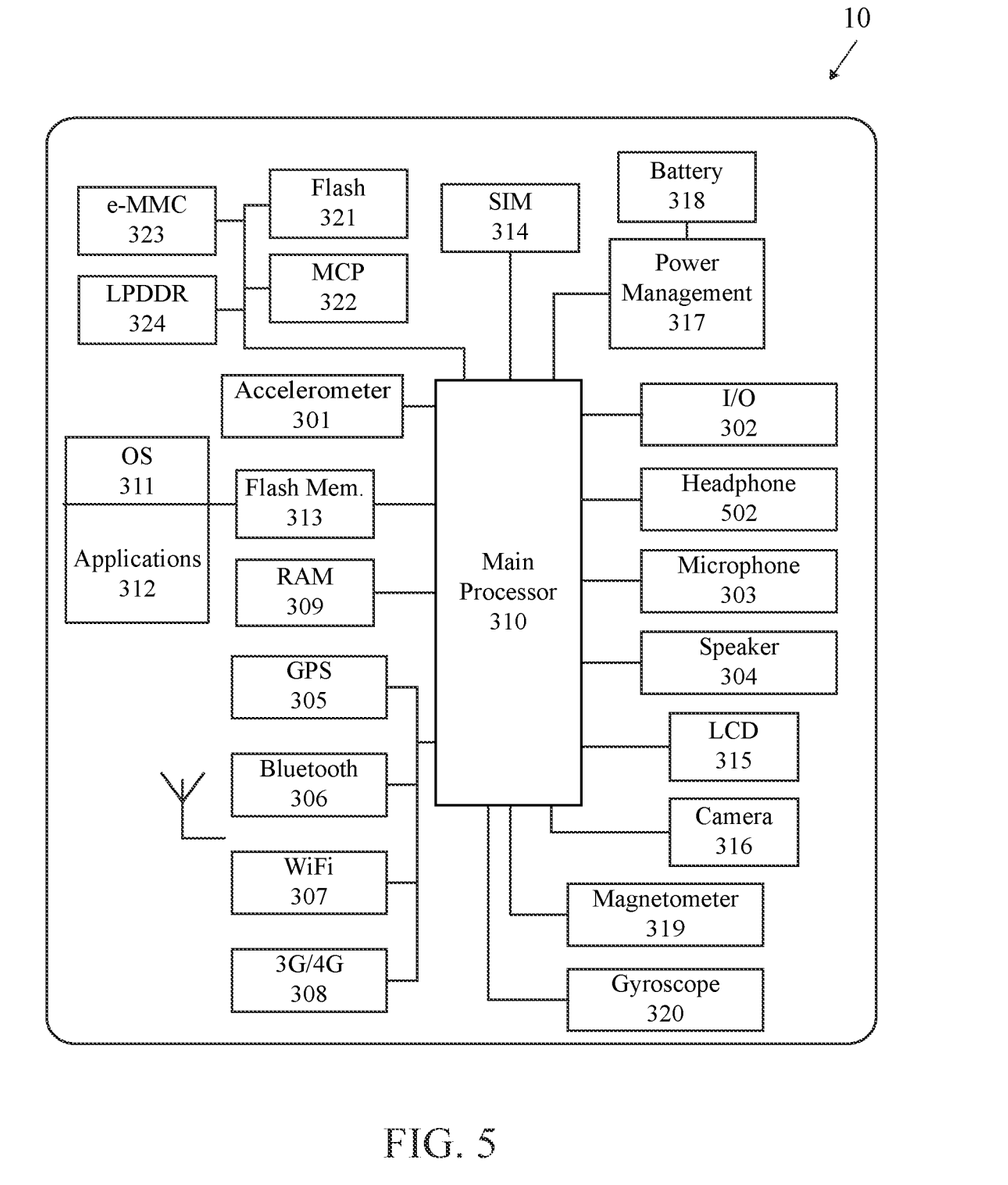
FIG. 5 is a block diagram of components of a mobile device.

FIG. 5 is a block diagram of components of a mobile device 10. The mobile device 10 preferably comprises an accelerometer 301, an input/output module 302, a microphone 303, a speaker 304, a GPS 305, a BLUETOOTH transceiver 306, a WiFi transceiver 307, a 3 G/4 G transceiver 308, a RAM memory 309, a main processor 310, an operating system (OS) module 311, an applications module 312, a flash memory 313, a SIM card 314, a LCD display 315, a camera 316, a power management module 317, a battery 318, a magnetometer 319, a gyroscope 320, a flash module 321, an MCP module 322, an e-MMC module 323, and an LPDDR module 324.

Figure 6:
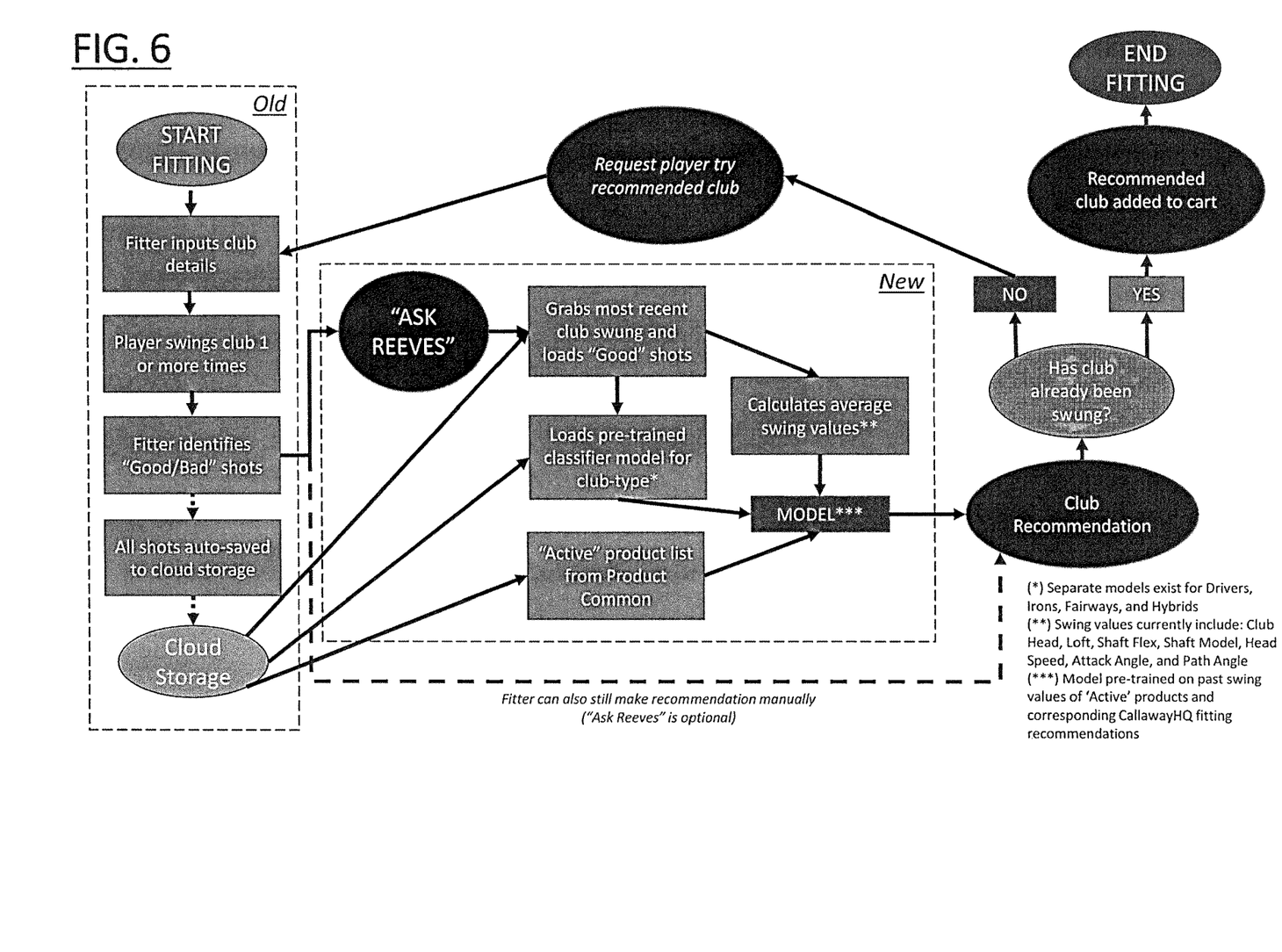
FIG. 6 is a process flow chart for A.I. fitting a golf club to a golfer.

FIG. 6 is a process flow chart for A.I. fitting a golf club to a golfer.

Helmsetter, U.S. Pat. No. 7,226,364 for a Method For Fitting Golf Clubs To A Golfer is hereby incorporated by reference in its entirety.

Peterson et al., U.S. Pat. No. 7,153,215 for a Method For Fitting A Golf Club To A Golfer is hereby incorporated by reference in its entirety.

Helmstetter et al., U.S. Pat. No. 6,368,230 for a Golf Club Fitting Device is hereby incorporated by reference in its entirety.

Aquinaldo et al., U.S. Pat. No. 8,403,770 for an Adjustable Golf Club Shaft And Hosel Assembly is hereby incorporated by reference in its entirety.

Hocknell et al., U.S. Pat. No. 7,354,353 for a Method For Fitting Golf Clubs To A Golfer is hereby incorporated by reference in its entirety.

In other embodiments, a golf club head may have a multi-material composition such as any of those disclosed in U.S. Patent Nos. 6,244,976, 6,332,847, 6,386,990, 6,406,378, 6,440,008, 6,471,604, 6,491,592, 6,527,650, 6,565,452, 6,575,845, 6,478,692, 6,582,323, 6,508,978, 6,592,466, 6,602,149, 6,607,452, 6,612,398, 6,663,504, 6,669,578, 6,739,982, 6,758,763, 6,860,824, 6,994,637, 7,025,692, 7,070,517, 7,112,148, 7,118,493, 7,121,957, 7,125,344, 7,128,661, 7,163,470, 7,226,366, 7,252,600, 7,258,631, 7,314,418, 7,320,646, 7,387,577, 7,396,296, 7,402,112, 7,407,448, 7,413,520, 7,431,667, 7,438,647, 7,455,598, 7,476,161, 7,491,134, 7,497,787, 7,549,935, 7,578,751, 7,717,807, 7,749,096, and 7,749,097, the disclosure of each of which is hereby incorporated in its entirety herein.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

I claim:

1. A method for fitting a golf club to a golfer, the method comprising:

inputting a plurality of club properties into a device, the device in communication with a SQL server comprising an artificial intelligence (AI) engine;

inputting shot data for a player's swing into the server;

sending a fitting ID and a shot ID as inputs to a python script stored on the server;

identifying active club type and swings that strike a golf ball from the data on the server;

loading a corresponding machine learning model for each club type selected from drivers, irons, fairways, and hybrids, wherein each model is trained on active products only to avoid possibility of recommending out-of-stock products;

inputting club IDs and average swing specs to the model;

inputting club data comprising at least one of head, loft, shaft flex, shaft model, average head speed, average attack angle, or average path angle outputting fitting data comprising at least one of head, loft, shaft flex, shaft model, shaft weight, or a probability of optimal fit; and processing loops until the AI engine repeats a club recommendation.

2. A method for fitting a golf club to a golfer, the method comprising:

inputting a plurality of club properties into a device, the device in communication with a SQL server comprising an artificial intelligence (AI) engine;

inputting shot data for a player's swing into the server;

sending a fitting ID and a shot ID as inputs to a python script stored on the server identifying active club type and swings that strike a golf ball from the data on the server;

loading a corresponding machine learning model for each club type selected from drivers, irons, fairways, and hybrids;

inputting club IDs and average swing specs to the model;

inputting club data comprising at least one of head, loft, shaft flex, shaft model, a verage head speed, average attack angle, or average path angle outputting fitting data comprising at least one of head, loft, shaft flex, shaft model, shaft weight, or a probability of optimal fit; and processing loops until the AI engine repeats a club recommendation;

wherein the each model has been trained on past swing data and the resulting recommendations made by a plurality of fitters.

3. A method for fitting a golf club to a golfer, the method comprising:
inputting a plurality of club properties into a device, the device in communication with a SQL server comprising an artificial intelligence (AI) engine;
inputting shot data for a player's swing into the server;
sending a fitting ID and a shot ID as inputs to a python script stored on the server;
identifying active club type and swings that strike a golf ball from the data on the server;
loading a corresponding machine learning model for each club type selected from drivers, irons, fairways, and hybrids;
inputting club IDs and average swing specs to the model;
inputting club data comprising at least one of head, loft, shaft flex, shaft model, a verage head speed, average attack angle, or average path angle
outputting fitting data comprising at least one of head, loft, shaft flex, shaft model, shaft weight, or a probability of optimal fit; and
processing loops until the AI engine repeats a club recommendation; wherein a plurality of components are compatible.

4. A method for fitting a golf club to a golfer, the method comprising:
inputting a plurality of club properties into a device, the device in communication with a SQL server comprising an artificial intelligence (AI) engine;
inputting shot data for a player's swing into the server;
sending a fitting ID and a shot ID as inputs to a python script stored on the server;
identifying active club type and swings that strike a golf ball from the data on the server;
loading a corresponding machine learning model for each club type selected from drivers, irons, fairways, and hybrids;
inputting club IDs and average swing specs to the model;
inputting club data comprising at least one of head, loft, shaft flex, shaft model, a verage head speed, average attack angle, or average path angle
outputting fitting data comprising at least one of head, loft, shaft flex, shaft model, shaft weight, or a probability of optimal fit; and
processing loops until the AI engine repeats a club recommendation; wherein the top three club options are presented in order of total probability.

5. A non-transitory computer readable medium storing instructions that optimize the fitting of a golf club to a golfer, when executed by a processor, cause the processor to:
inputting a plurality of club properties into a device, the device in communication with a SQL server comprising an artificial intelligence (AI) engine;
inputting shot data for a player into the server;
sending a fitting ID and a shot ID as inputs to a python script stored on the server;
identifying active club type and swings that strike a golf ball from the data on the server;
loading a corresponding machine learning model for each club type selected from drivers, irons, fairways, and hybrids, wherein each model is trained on active products only to avoid possibility of recommending out-of-stock products;
inputting club IDs and average swing specs to the model;
inputting club data comprising at least one of head, loft, shaft flex, shaft model, average head speed, average attack angle, or average path angle
outputting fitting data comprising at least one of head, loft, shaft flex, shaft model, shaft weight, or a probability of optimal fit; and
processing loops until the AI engine repeats a club recommendation.

6. The non-transitory computer readable medium according to claim 5 wherein the models have been trained on past swing data and the resulting recommendations made by a plurality of fitters.

7. The non-transitory computer readable medium according to claim 5 wherein a plurality of components are compatible.

8. The non-transitory computer readable medium according to claim 5 wherein the top three club options are presented in order of total probability.

* * * * *